United States Patent
Inui et al.

[11] Patent Number: 5,964,890
[45] Date of Patent: Oct. 12, 1999

[54] SYSTEM CALL ISSUE METHOD AND DEBUG SYSTEM

[75] Inventors: Toshiyuki Inui; Takahiro Muranaka; Hiroyuki Muraki; Akiya Fukui, all of Hyogo, Japan

[73] Assignees: Mitsubishi Electric Semiconductor Software Co., Ltd., Itami; Mitsubishi Denki Kabushiki Kaisha, Tokyo, both of Japan

[21] Appl. No.: 08/917,386

[22] Filed: Aug. 26, 1997

[30] Foreign Application Priority Data

Mar. 27, 1997 [JP] Japan ................................. 9-076088
Jun. 4, 1997 [JP] Japan ................................. 9-146888

[51] Int. Cl.⁶ ............................................. G06F 11/00
[52] U.S. Cl. ........................................................ 714/28
[58] Field of Search ................................. 395/701, 704, 395/712, 183.04, 183.05, 183.14

[56] References Cited

U.S. PATENT DOCUMENTS

| | | | |
|---|---|---|---|
| 4,845,615 | 7/1989 | Blasciak | 395/182.08 |
| 5,047,919 | 9/1991 | Sterling et al. | 395/184.01 |
| 5,265,254 | 11/1993 | Blasciak et al. | 395/704 |
| 5,450,586 | 9/1995 | Kuzara et al. | 395/704 |
| 5,812,748 | 9/1998 | Ohran et al | 714/29 |

FOREIGN PATENT DOCUMENTS 8-95821   4/1996   Japan .

*Primary Examiner*—Robert W. Beausoliel, Jr.
*Assistant Examiner*—Pierre Eddy Elisca
*Attorney, Agent, or Firm*—Burns, Doane, Swecker & Mathis, LLP

[57] ABSTRACT

In a system call issue method and a debug system, during execution of a target program, data transfer is performed between an emulator and an OS kernel forming the target program through a memory field in a RAM. It is checked whether there is a system call issue request in the memory field and if there is the system call issue request in the memory field, the emulator issues a system call.

8 Claims, 3 Drawing Sheets

SYSTEM CALL ISSUE METHOD AND DEBUG SYSTEM

BACKGROUND OF THE INVENTION

1. Field of the Invention

The present invention relates to a system call issue method and a debug system based on the system call issue method of issuing a system call for a real time Operating System (a real time OS) executed by an emulator when an application program using the real time OS is debugged.

2. Description of the Prior Art

Recently, it is becoming increasingly important for a debug system to have various functions for debugging the application programs accompanied with increasing of the number of systems using the application programs based on a real time Operating system (a real time OS). There is a function for issuing a system call of a real time OS as one of the functions. When an operator as users uses this function, it is possible to have services of real time OS, for example, the functions for changing the priority of a task, for terminating a task, for keeping a task in a wait state, for changing the flag pattern of an event flag, and the like. This causes a reduction in the debugging time period for the application programs using the real time OS.

For example, a debugging operation for a remote control processing is performed by using a key input handler and a remote control processing task. In this case, the key input handler issues a system call and transfers information indicating that any key has been selected and pushed by an operator, to the remote control processing task. When receiving the information as a message, the remote call processing task is executed in different ways according to the content of the received information.

In the debugging operation, there is a case to check whether or not an application program is correctly executed when a specified key is pushed. If an emulator issues no system call, it must be required for the remote control processing task to set the content of a program counter in a microcomputer, the contents of registers, the contents of memories used by a task, and the like.

On the contrary, when the emulator has the function to issue a system call, an operator inputs a command to issue the system call through a front end program executed in a host computer in order to perform the debugging operation described above. In addition, it can be easily realized by writing a script to issue a system call through the front end program that the test of the application programs are executed by pushing keys randomly.

FIG. 1 is a diagram showing a configuration of a debug system. In the diagram, the reference number 1 designates a host computer such as a personal computer or a work station in which a program is executed. This program is called as "a front end program" or "a front end" for short that provides debug commands by communicating with a target program 5 during debugging, processes data items transferred from a target board 4, and converts the data items so that users can recognize them and displays them.

FIG. 2 is a configuration diagram showing a conventional operation flow between the front end 1-1 and the target program 5 when a system call is issued during debugging. As shown in the diagram, the target program 5 comprises an operating system kernel (an OS kernel) 51, a user program 52, a debug task 53, and a communication processing program (not shown) for communicating with the host computer. When a user inputs a system call issue command into the front end 1-1 as the program that is executed by the host computer 1, the front end 1-1 transfers the system call issue command to the target program 5 by using an interrupt such as a serial interrupt.

When the interrupt is issued by the front end 1-1, the communication processing program in the target program 5 receives the data relating the system call issue command and initiates the operation of the debug task 53. The debug task whose operation has been initiated analyzes the data transferred from the front end 1-1. When there is a system call issue request in the data transferred from the front end 1-1, the debug task 53 sets parameters of the system call into registers and controls the operation flow so that the operation flow will jump to the system call process.

As described above, because the conventional system call issue method has the above described configuration and uses the serial interrupt process, it must be required to use a part of a hardware resource for debugging. In addition to this drawback, it must be required to include the communication processing program in a part of the user program in order to communicate between the host computer and the debug task. Furthermore, there is a drawback in which the area in memories ROM and RAM required for a stack region of debug tasks, a data region to control the debug tasks, and a data region to use the communication with the host computer is increased. In order to increase the size of an available memory region in the memories ROM and RAM, it must be required to eliminate the memory regions used for the debug task and the communication processing program to communicate with the host computer.

That is, in the actual fabrication process to fabricate application products after the completion of debugging, when the user program is written into a ROM after the completion of debugging, the debug task is no longer required. Because the debug task and the communication processing program to communicate with the host computer use approximately several tens K bytes, the available memory size in the ROM or the RAM is greatly decreased when they are written into the ROM or the RAM. Accordingly, in order to increase the available memory size in the ROM or the RAM, it is required to eliminate the memory region of the debug task, for example. However, there is a drawback that the operation to eliminate the debug task from the ROM or the RAM requires a long working time period and causes operation error.

SUMMARY OF THE INVENTION

Accordingly, an object of the present invention is, with due consideration to the drawbacks of the conventional debug system and the conventional system call issue method, to provide a debug system and a system call issue method that are capable of reducing a memory size to be used for a system call issue operation.

In accordance with a preferred embodiment of the present invention, a debug system comprises a host computer having a front end for inputting a system call issue request provided by the operator through the front end, an emulator for receiving the system call issue request from the host computer and for writing the system call issue request into a memory field in a memory, an emulation pod having a microcomputer whose operation is controlled by the emulator, and a target board having a target program having a real time operating system kernel to be debugged, wherein data transmission between the emulator and the real time operating system kernel in the target program in the target board is executed while the microcomputer incorporated in the emulation pod executes the target program through the memory field, and the system clock interrupt process of the operating system kernel checks whether or not there is the system call issue request in the memory field and the real time operating system executes a system call if there is the system call issue request in the memory field.

In the debug system as another preferred embodiment of the present invention according to the present invention, the system clock interrupt process checks whether or not there is the system call issue request in the memory field when a timer interrupt used by the real time operating system is issued while the microcomputer in the emulation pod executes the target program, and the real time operating system executes the system call processing if there is the system call issue request in the memory field.

In accordance with another preferred embodiment of the present invention, a system call issue method comprises the steps of providing a system call issue request requested by the operator to an emulator through a front end executed by a host computer, storing the system call issue request into a memory field by the emulator, performing data transmission between the emulator and a real time operating system kernel forming a target program to be debugged while the target program is executed by a microcomputer incorporated in an emulation pod through the memory field, and checking whether or not there is the system call issue request through the memory field by the system clock interrupt process and executing a system call by the real time operating system kernel if there is the system call issue request.

In the system call issue method as another preferred embodiment according to the present invention, checking whether or not there is the system call issue request by using a system clock interrupt process while the target program is executed, and issuing the system call by the emulator if there is the system call issue request.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the system call issue method and the debug system based on the system call issue method according to the present invention will now be described with reference to the drawings.

First Embodiment

Figure 1:
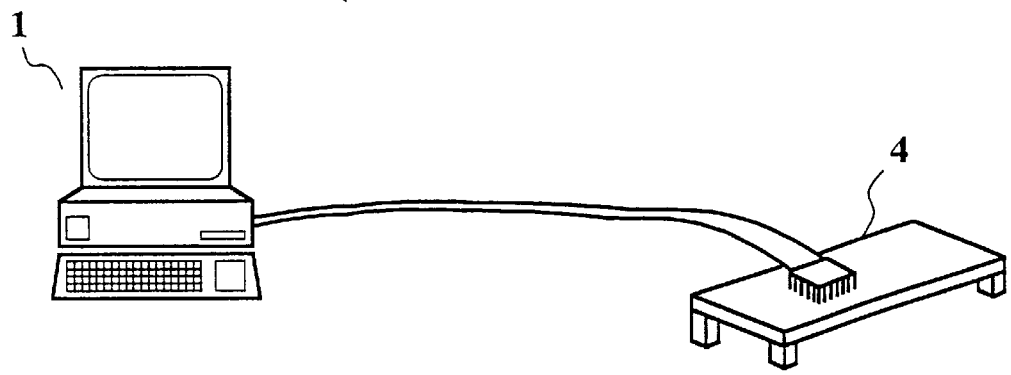
FIG. 1 is a diagram showing a configuration of a debug system.
Figure 2:
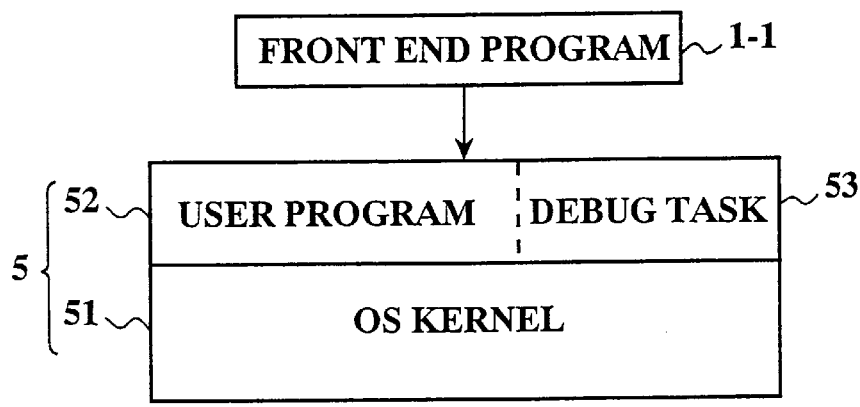
FIG. 2 is a configuration diagram explaining a conventional operation flow between a front end program and a target program when a system call is issued during debugging.
Figure 3:
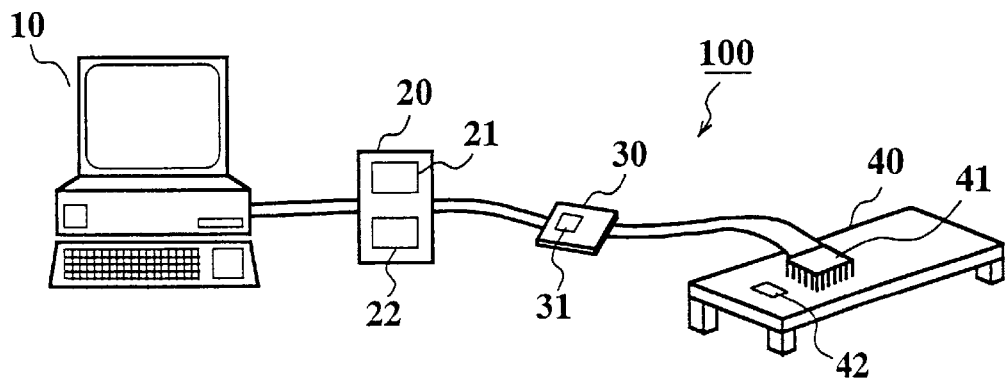
FIG. 3 is a diagram showing a configuration of a general view of a debug system according to the present invention.

FIG. 3 is a diagram showing a configuration of a general view of the debug system according to the present invention. In FIG. 3, the reference number 10 designates a host computer such as a personal computer, a work station, and the like, 20 denotes an emulator. The reference number 100 indicates the debug system of the present invention comprising the host computer 10, the emulator 20, an emulation pod 30, and a target board 40 to be debugged.

The host computer 10 stores a front end program or a front end 10-1 in short as a program to control the operation of the emulator 20 during debugging. An operator as users inputs command which requires debugging through the front end 10-1 executed by the host computer 10. The front end 10-1 receives the command indicated by the operator and transmits it to the emulator 20. In addition to this, the front-end 10-1 processes data transferred from the emulator 20 so that the operator can understand the content of the data and then provides it to the operator through a display means such as a display device. The reference number 30 designates the emulation pod comprising a microcomputer 31. The operation of this microcomputer 31 in the emulation pod 30 is controlled based on the command transferred from the front end 10-1 executing by the host computer 10. A program (not shown) in the emulator 20 for controlling the operation of the microcomputer 31 in the emulation pod 30 is called as a monitor program.

The host computer 10 inputs the command indicated by the operator through the front-end 10-1. The front end 10-1 provides this command to the emulator 20. The program executed in the emulator 20 receives the command and the controls the operation of the microcomputer 31 in the emulation pod 30 based on the content of the command.

The microcomputer 31 incorporated in the emulation pod 30 executes and controls a target program 8 stored in a memory 42 mounted on the target board 40.

The request of a system call from the operator is inputted through the front end 10-1 executed by the host computer 10 and stored into a memory region. The request of the system call is transferred to the target program 8 through the memory region in a Random Access Memory (RAM).

It is acceptable that the memory region in the RAM to which the request of the system call issue from the operator is stored is formed in an emulation memory 22 in the emulator 20 or in the memory 42 mounted on the target board 40.

Figure 4:
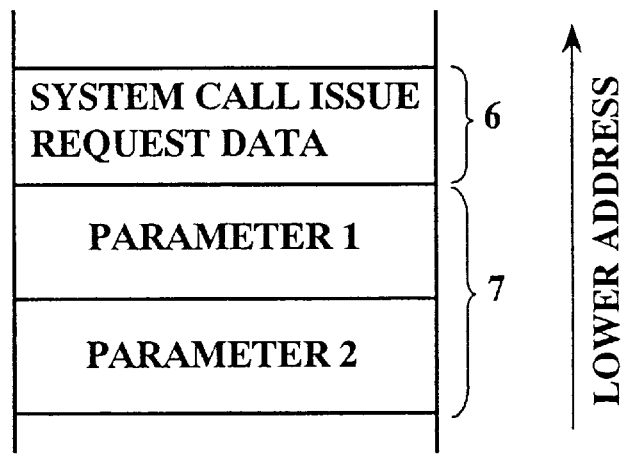
FIG. 4 is an explanation diagram showing data stored in a RAM used in embodiments according to the present invention.

FIG. 4 is an explanation diagram showing the data stored in the memory region in the RAM used in the embodiments according to the present invention. As shown in FIG. 4, in the memory field in the RAM to be used by the embodiments of the present invention, a request data item for a system call issue and parameters such as a parameter 1 and a parameter 2 are stored in the memory fields 6 and 7 designated by using lower addresses. However, the present invention is not limited by this case, for example, it is acceptable to store them into memory fields in the memory region addressed by using upper addresses.

In FIG. 4, the reference number 6 designates the memory field into which and from which system call issue data items are written and read out in order to detect whether or not there is a system call request. The reference number 7 denotes the memory field into which parameters of the system call issue request are stored. The start address for the memory fields in the memory region in the RAM can be set anywhere in memory fields in the RAM which can be used for a real time Operating System (OS). The size of the memory field in the memory region in the RAM depends on a size of a parameter to be required for a system call or a size that is handled by the microcomputer.

Next, a description will be given of the operation of the debug system 100 and the system call issue method as the first embodiment.

Figure 5:
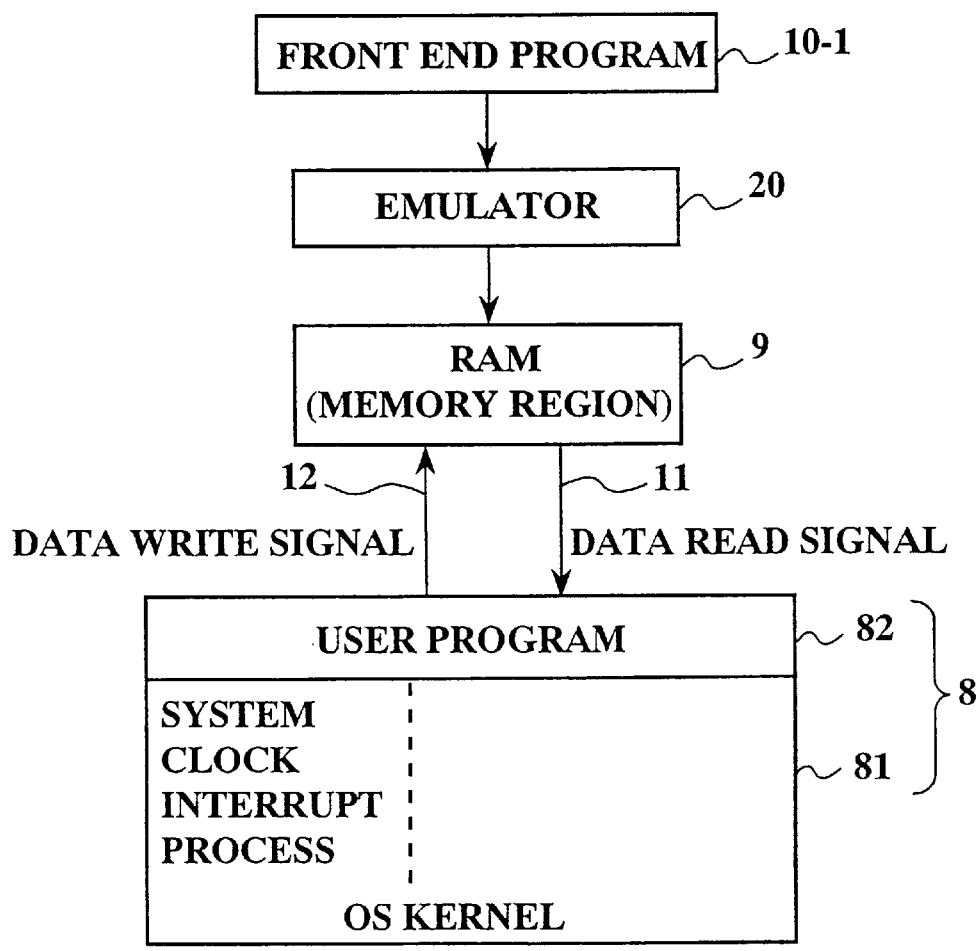
FIG. 5 is an explanation diagram showing an operation flow to issue a system call by an emulator in the debug system and the system call issue method as the first and second embodiments according to the present invention.

FIG. 5 is an explanation diagram showing an operation flow to issue a system call by the emulator 20 in the debug system and the system call issue method as the first and second embodiments according to the present invention.

The target program 8 comprising the OS kernel 81 and the user program 82 is stored in the memory 42 mounted on the target board 40. The target program 8 checks the content of the data stored in the memory region 9 in the RAM (the memory section) every time a timer interrupt used by the real time OS occurs.

First, when the microcomputer 31 in the emulation pod 30 executes the target program 8 stored in the memory 42 mounted on the target board 40 and an operator inputs a command for a system call issue request into the front end 10-1 executed by the host computer 10, the emulator 20 writes parameters of the system call into the memory field 7 in the memory region 9 in the RAM and also writes a system call issue request data item into the memory field 6 in the memory region 9 in the RAM.

The target program 8 reads the data stored in the memory region 9 in the RAM and checks for the presence of a system call issue request based on the content of the read data item by using a system clock interrupt process and the data read signal 11 shown in FIG. 5 when the timer interrupt used by the real time OS occurs. When there is the request of the system call issue request in the memory region 9, the target program 8 issues the system call and then writes data into the memory region 9 in the RAM by using the data write signal 12 shown in FIG. 5 in order to delete the presence of the system call issue request from the memory region 9 in the RAM.

Figure 6:
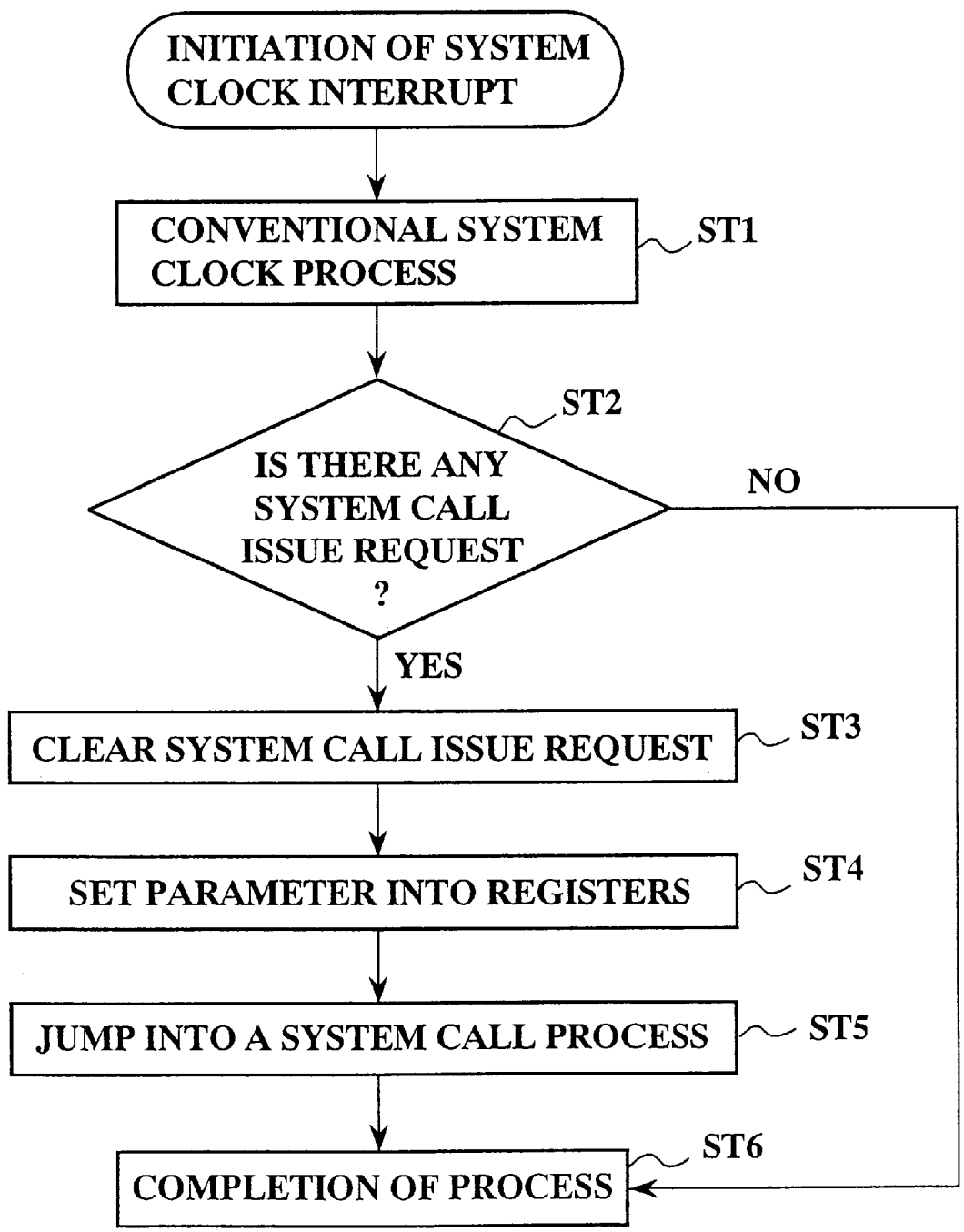
FIG. 6 is a flow chart showing a system clock interrupt process executed by the system call issue method and the debug system of the first and second embodiments according to the present invention.

FIG. 6 is a flow chart showing a system clock interrupt process executed by the system call issue method and the debug system of first and second embodiments according to the present invention.

First, a system clock interrupt process such as a time out process, like a conventional process, is performed after its operation is initiated (step ST1). Next, data stored in the memory field 6 in the memory region 9 in the RAM is read out. It is then checked whether or not there is any system call issue request (Step ST2). When it is detected that there is a system call issue request after the step ST2, data in order to clear the system call issue request is written into the memory field 6 in the memory region 9 in the RAM (Step ST3).

The OS kernel 81 reads the parameters of the system call stored in the memory field 7 in the memory region 9 and sets these parameters into registers (not shown) (Step ST4). When the process flow jumps into a system call process based on a software interrupt or a jump instruction, the emulator 20 issues the system call, and then the process is completed (Step ST6).

As described above, according to the debug system and the system call issue method as the first embodiment, it is possible for the emulator 20 to issue the system call during the execution of the target program 8. In addition to this, because the debug task and the communication processing are no longer required, there is the effect that it is possible to reduce the size of the memory region required for performing the system call issue method when comparing with the conventional system call issue method in which the conventional debug task is used. Furthermore, because no serial interrupt for communication is used, there is the effect that the hardware resource is not reduced.

Second Embodiment

The system call issue method of the first embodiment is the method in which a system call is issued during execution of the target program 8 by the emulator 20. The system call issue method of the second embodiment is the method that is capable of accepting a system call issue operation by the emulator 20 based on a command of a system call issue request inputted by an operator as users through the front end 10-1 even if the operation of the target program is halted or stopped. The configuration of the debug system of the second embodiment is the same as that of the debug system of the first embodiment as shown in FIG. 3, therefore, the explanation of the debug system of the second embodiment is omitted here.

Next, a description will be given of the operation of the debug system and the system call issue method as the second embodiment.

First, when inputting a system call issue command transferred from the front end 10-1 executed by the host computer 10 during the execution of the target program 8, the emulator 20 writes parameters for the system call into the memory field 7 in the memory region 9 in the RAM and also writes the system call issue request data into the memory field 6 in the memory region 9 in the RAM for preparation of the system call issue operation. As described in the description of the first embodiment, the target program 8 is capable of checking the contents of data items stored in the memory fields 6 and 7 in the memory region in the RAM every time a timer interrupt used by the real time OS occurs. In this state, when a system clock interrupt process occurs after the operation of the target program 8 is initiated, the series of the process shown in FIG. 6 is executed, so that the emulator 20 can issue a system call.

As described above, according to the debug system and the system call issue method of the second embodiment, because it is possible to perform the preparation for a system call issue even if the operation of the target program 8 is halted or stopped, it is thereby to perform the debug operation easily when comparing the system call issue method of the first embodiment.

What is claimed is:

1. A debug system, comprising:

a host computer having a front end for inputting a system call issue request provided by an user through the front end;

an emulator for receiving the system call issue request transferred from the host computer and for writing the system call issue request into a memory field;

an emulation pod having a microcomputer whose operation is controlled by the emulator; and a target board having a target program having a real time operating system kernel to be debugged, wherein data transmission between the emulator and the real time operating system kernel in the target program in the target board is executed while the microcomputer incorporated in the emulation pod executes the target program through the memory field, and the system clock interrupt process of the operating system kernel checks whether or not there is the system call issue request in the memory field and the real time operating system executes a system call if there is the system call issue request in the memory field.

2. A debug system as claimed in claim 1, wherein the system clock interrupt process checks whether or not there is the system call issue request in the memory field when a timer interrupt used by the real time operating system is happened while the microcomputer in the emulation pod executes the target program, and the emulator issues the system call if there is the system call issue request in the memory field.

3. A system call issue method as claimed in claim 1, wherein checking whether or not there is the system call issue request by using a system clock interrupt process while the target program is executed, and issuing the system call by the emulator if there is the system call issue request.

4. A debug system as claimed in claim 1, wherein said emulator comprises an emulation memory, said emulation memory including the memory field into which the system call issue request is written.

5. A debug system as claimed in claim 1, wherein said target board comprises a memory, said memory including the memory field into which the system call issue request is written.

6. A debug system as claimed in claim 1, wherein said target program further has a user application, and after said real time operating system executes a system call, said target program writes data into the memory field to delete the system call issue request.

7. A system call issue method comprising the steps of:

providing a system call issue request requested by an user to an emulator through a front end program executed by a host computer;

storing the system call issue request into a memory field by the emulator;

performing data transmission between the emulator and a real time operating system kernel forming a target program to be debugged while the target program is executed by a microcomputer incorporated in an emulation pod through the memory field; and checking whether or not there is the system call issue request through the memory field by the system clock interrupt process and executing a system call by the real time operating system kernel if there is the system call issue request.

8. A debug system as claimed in claim 3, wherein said target program includes a user application, and further comprising the step of, after the system call is executed by the real time operating system, writing data into the memory field, by the target program, to delete the system call issue request from the memory field.

\* \* \* \* \*